United States Patent
Malnati et al.

(10) Patent No.: US 7,543,027 B1
(45) Date of Patent: Jun. 2, 2009

(54) OPERATOR MESSAGING WITHIN AN ENVIRONMENT FOR OPERATING MULTIPLE COMPUTING SYSTEMS

(75) Inventors: James R. Malnati, Stillwater, MN (US); Tyson R. Midboe, Minneapolis, MN (US); John E. Trierweiler, Maplewood, MN (US); Donald J. Ethen, New Brighton, MN (US)

(73) Assignee: Unisys Corporation, Blue Bell, PA (US)

( * ) Notice: Subject to any disclaimer, the term of this patent is extended or adjusted under 35 U.S.C. 154(b) by 1208 days.

(21) Appl. No.: 10/351,103

(22) Filed: Jan. 24, 2003

(51) Int. Cl.
*G06F 15/16* (2006.01)
(52) U.S. Cl. .................. 709/206; 709/226
(58) Field of Classification Search .................. 709/226
See application file for complete search history.

(56) References Cited

U.S. PATENT DOCUMENTS

| | | | | |
|---|---|---|---|---|
| 4,937,825 | A * | 6/1990 | Ballard et al. | 714/712 |
| 5,448,631 | A * | 9/1995 | Cain | 379/201.01 |
| 5,666,486 | A * | 9/1997 | Alfieri et al. | 709/217 |
| 5,920,718 | A * | 7/1999 | Uczekaj et al. | 717/109 |
| 5,987,514 | A * | 11/1999 | Rangarajan | 709/224 |
| 6,009,103 | A * | 12/1999 | Woundy | 370/401 |
| 6,219,669 | B1 * | 4/2001 | Haff et al. | 707/10 |
| 6,230,198 | B1 * | 5/2001 | Dawson et al. | 709/224 |
| 6,298,451 | B1 * | 10/2001 | Lin | 714/4 |
| 6,347,330 | B1 * | 2/2002 | Dawson et al. | 709/203 |
| 6,389,464 | B1 * | 5/2002 | Krishnamurthy et al. | 709/220 |
| 6,405,312 | B1 * | 6/2002 | Ly | 713/155 |
| 6,442,571 | B1 * | 8/2002 | Haff et al. | 707/201 |
| 6,445,774 | B1 * | 9/2002 | Kidder et al. | 379/9.03 |
| 6,505,245 | B1 * | 1/2003 | North et al. | 709/223 |
| 6,681,114 | B2 * | 1/2004 | Chang et al. | 455/456.3 |
| 6,757,374 | B2 * | 6/2004 | Bardehle | 379/265.09 |
| 6,829,639 | B1 * | 12/2004 | Lawson et al. | 709/224 |
| 6,891,566 | B2 * | 5/2005 | Marchese | 348/211.3 |
| 6,898,737 | B2 * | 5/2005 | Goeller et al. | 714/39 |
| 6,922,724 | B1 * | 7/2005 | Freeman et al. | 709/223 |
| 6,928,425 | B2 * | 8/2005 | Grefenstette et al. | 707/2 |
| 6,993,576 | B1 * | 1/2006 | Labedz et al. | 709/223 |
| 7,031,798 | B2 * | 4/2006 | Brown et al. | 700/174 |
| 7,043,000 | B2 * | 5/2006 | Delaney et al. | 379/221.08 |
| 7,062,230 | B1 * | 6/2006 | Ishiguro et al. | 455/91 |

(Continued)

OTHER PUBLICATIONS

Padwick, G., Special Edition Using Microsoft Outlook 2002, May 17, 2001, Que, pp. ii, 65, 72, 73, 80, 81, 96, 100, 109 and 177.*

*Primary Examiner*—Jeffrey Pwu
*Assistant Examiner*—Alicia Baturay
(74) *Attorney, Agent, or Firm*—Charles A. Johnson; Robert A. Marley; Crawford Maunu

(57) ABSTRACT

A method and apparatus for sending a message from a first operator at a first workstation to a second operator at a second workstation in an operations-computing arrangement for operating one or more computer systems. The operations-computing arrangement includes the first and second workstations, which are coupled to respective operations servers. Each operations server is coupled to at least one computer system, each workstation executes software that provides an operator interface for operating a computer system, and each operations server provides an interface to a computer system. The infrastructure used to transmit system-generated event reports to operators at the workstations is used to transmit text messages between operators.

9 Claims, 6 Drawing Sheets

U.S. PATENT DOCUMENTS

| | | | |
|---|---|---|---|
| 7,092,940 B1* | 8/2006 | Ethen et al. | 707/6 |
| 7,137,074 B1* | 11/2006 | Newton et al. | 715/835 |
| 7,139,938 B2* | 11/2006 | Marwaha | 714/48 |
| 7,140,014 B2* | 11/2006 | Coryell et al. | 717/176 |
| 7,272,660 B1* | 9/2007 | Powers et al. | 709/238 |
| 2002/0007423 A1* | 1/2002 | Arao | 709/318 |
| 2002/0049962 A1* | 4/2002 | Kelbaugh et al. | 717/128 |
| 2002/0156873 A1* | 10/2002 | Wilson et al. | 709/220 |
| 2002/0161876 A1* | 10/2002 | Raymond | 709/223 |
| 2003/0028599 A1* | 2/2003 | Kolsky | 709/206 |
| 2003/0028669 A1* | 2/2003 | Batsleer et al. | 709/240 |
| 2003/0120657 A1* | 6/2003 | French et al. | 707/10 |
| 2004/0109030 A1* | 6/2004 | Farrington et al. | 345/808 |
| 2004/0181685 A1* | 9/2004 | Marwaha | 713/201 |
| 2005/0102382 A1* | 5/2005 | MacGregor et al. | 709/223 |
| 2005/0108387 A1* | 5/2005 | Li et al. | 709/224 |
| 2006/0271695 A1* | 11/2006 | Lavian | 709/229 |

* cited by examiner

OPERATOR MESSAGING WITHIN AN ENVIRONMENT FOR OPERATING MULTIPLE COMPUTING SYSTEMS

FIELD OF THE INVENTION

The present invention relates to operating computer systems, and more particularly to exchanging messages between operators of computer systems.

BACKGROUND OF THE INVENTION

Large-scale computer systems often host multiple applications that support many users. Example applications include database applications, file servers, and software services. Some large-scale computer systems are controlled and managed by operators. The users are those who rely on the services provided by a system, and operators are those who are those responsible for keeping the systems operational. Operators generally provide first level support for applications, databases, and network exceptions or requests, and escalate any issues to the appropriate support personnel.

Many products have been developed to assist operators in performing their designated tasks. For example, the Single Point Operations (SPO) product from Unisys is a LAN-based arrangement, including software hosted by workstations connected to the LAN, that supports various operations scenarios. For example, the SPO arrangement supports operations of multiple systems by a single operator, operations of a single system by multiple operators, and various alarm and automation functions.

In some environments the systems controlled by a SPO arrangement are not in the same locale. The systems may be in different rooms or even in different cities or regions. Similarly, the SPO arrangement may have workstations that are not at the same site, and operators at different sites.

Operators at different sites often need to coordinate their activities, and in order to coordinate they need to communicate. Common channels for communicating may present problems for operator communications. For example, use of telephones may distract operators from monitoring workstation displays, email may not be viable in secure LAN arrangements. Therefore, a method and apparatus that address the aforementioned problems, as well as other related problems, are desirable.

SUMMARY OF THE INVENTION

The present invention supports sending a message from a first operator at a first workstation to a second operator at a second workstation in an operations-computing arrangement for operating one or more computer systems. The operations-computing arrangement includes the first and second workstations, which are coupled to respective operations servers. Each operations server is coupled to at least one computer system, each workstation executes software that provides an operator interface for operating a computer system, and each operations server provides an interface to a computer system. The infrastructure used to transmit system-generated event reports to operators at the workstations is used to transmit text messages between operators.

The above summary of the present invention is not intended to describe each disclosed embodiment of the present invention. The figures and detailed description that follow provide additional example embodiments and aspects of the present invention.

BRIEF DESCRIPTION OF THE DRAWINGS

Other aspects and advantages of the invention will become apparent upon review of the Detailed Description and upon reference to the drawings in which.

DETAILED DESCRIPTION

Figure 1:
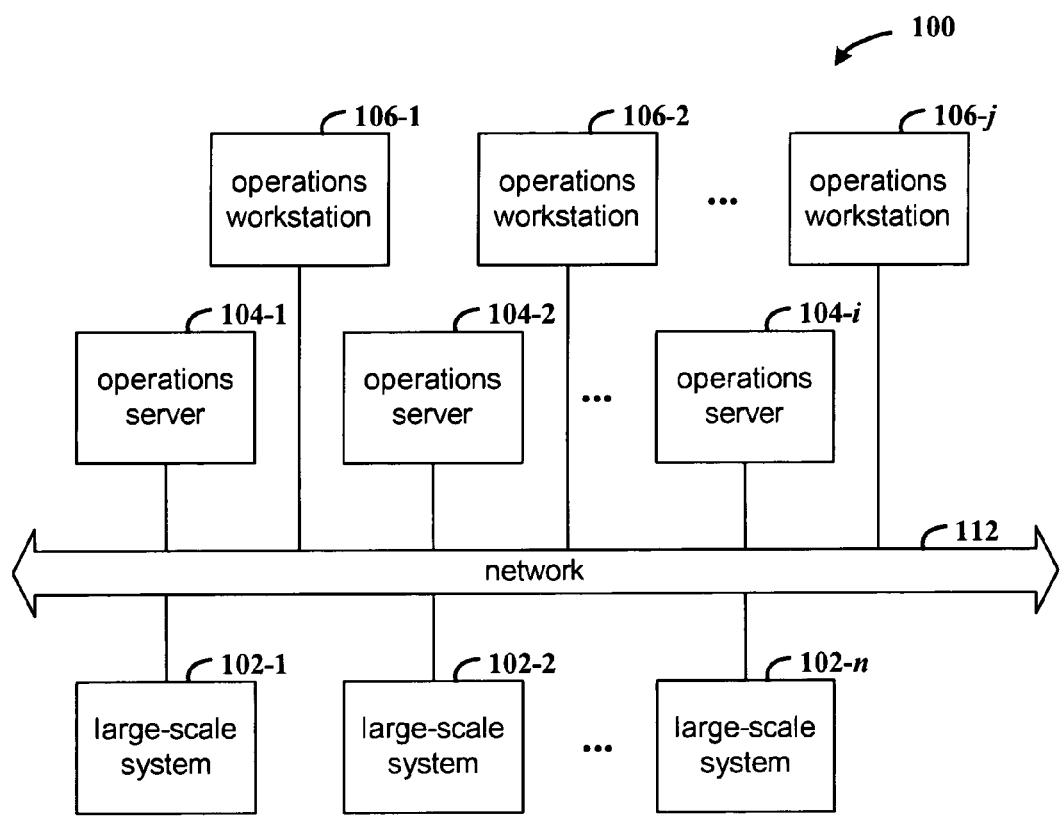
FIG. 1 is a functional block diagram of a computing arrangement in which multiple large-scale systems are operated via a workstation and server arrangement.

FIG. 1 is a functional block diagram of a computing arrangement 100 in which multiple large-scale systems 102-1-102-$n$ are operated via a workstation and server arrangement. The example workstation and server arrangement includes multiple operations servers 104-1-104-$i$ and multiple operations workstations 106-1-106-$j$. Specific example types of large-scale systems include ES7000, ClearPath, and ClearPath Plus systems from Unisys. Operators of systems 102-1-102-$n$ use an arrangement of workstations and servers to operate, control, and manage the systems. The Single Point Operations (SPO) product, also from Unisys, is an example software system that is deployable in various combinations of operations servers and operations workstations. The combination of operations software, and the operations servers and workstations is referred to as an "operations environment."

The operational interfaces of the large-scale systems are coupled to the operations servers via a network 112. The operations workstations are also coupled to the operations servers via the network. The characteristics of network 112 (e.g., LAN vs. WAN, dedicated vs. shared, etc.) depend on the implementation requirements of the computing arrangement.

A first software component (not shown) executes on an operations server and interacts with the operational interface (not shown) of one or more large-scale systems. A second component (not shown), executing an operations workstation, provides the user interface for an operator and is interfaced with the component on the operations server. An example configuration of servers and workstations in a SPO environment includes a PC running Microsoft Windows 2000 and the SPO workstation client applications and, for example, an Aquanta Enterprise Server running Windows 2000 Server and the SPO server daemons.

The present invention allows an operator at one operations workstation to communicate via text messages with an operator at another operations workstation using the event reporting infrastructure of the operations environment. This allows the operators to use the same interface that is used to control the systems for inter-operator message passing.

Figure 2:
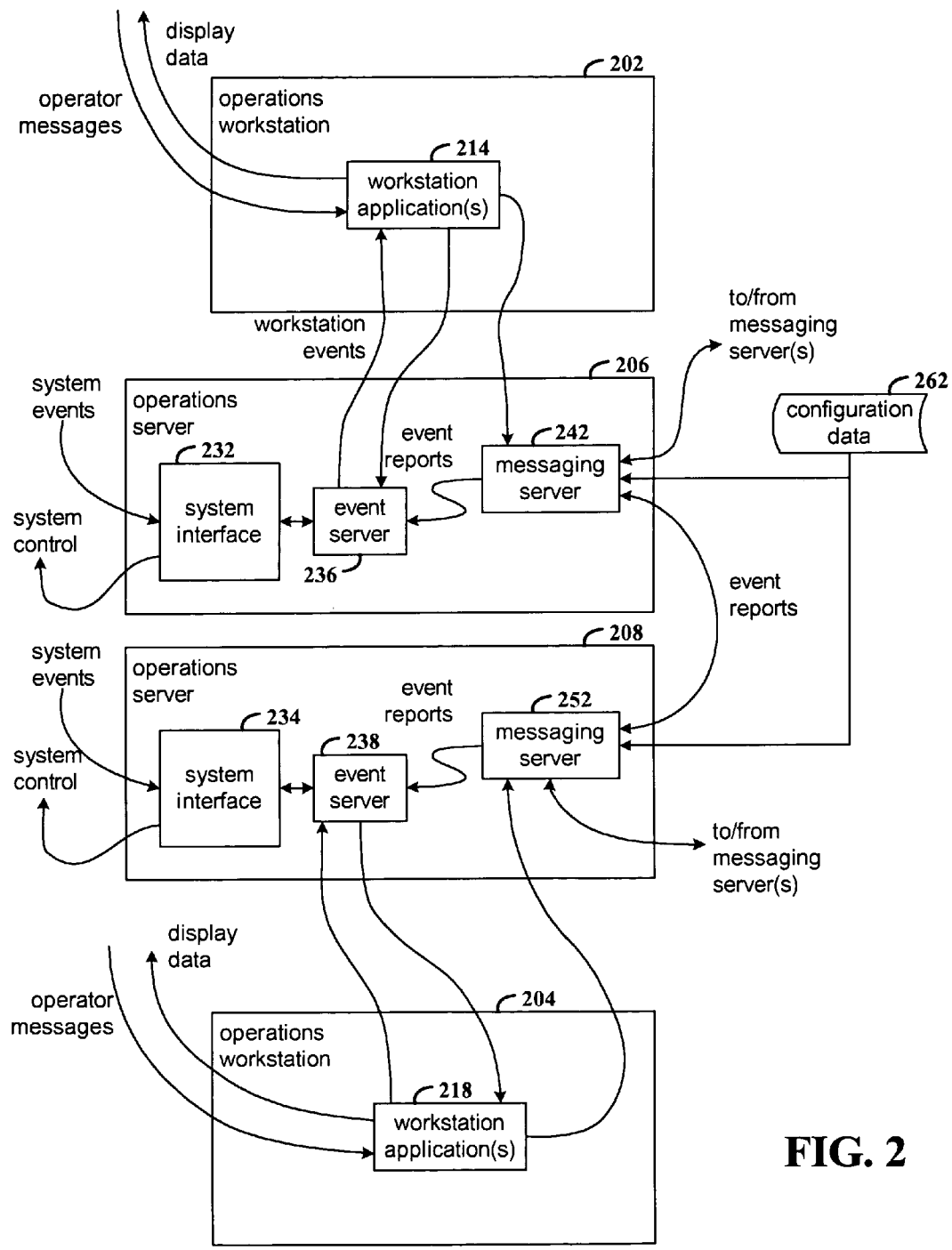
FIG. 2 is a block diagram that illustrates the transfer of a text message from an operator at one operations workstation to an operator at another operations workstation via an event-reporting infrastructure implemented on the operations servers and operations workstations.

FIG. 2 is a block diagram that illustrates the transfer of a text message from an operator at one operations workstation to an operator at another operations workstation via the event-reporting infrastructure implemented on the operations servers and operations workstations. The example operations workstations and operations servers have reference numerals 202, 204, 206, and 208, respectively. Each of the operations workstations includes a set of workstation applications, for example, in a SPO environment the SPO console, SPO status, and the SPO messaging client applications. Operations workstation 202 includes the set of workstation applications 214, and operations workstation 204 includes the set of workstation applications 218.

Workstation applications 214 and 218 support the input of data from and the output of data to an operator. Such data include, for example, text, graphics, and audio data. Data that are input by the operator are used, for example, to control the system from the workstation or to obtain status information related to the system. Data that are output to an operator indicate some status of the system. A workstation application also provides functions for controlling a system, automating operation of a system, and obtaining and reporting status information from the system. Thus, control data input by an operator is processed by the workstation application before being presented to an operations server, which passes system control data to the system. Similarly, data received from a system by an operations server are forwarded to a workstation application, which outputs data if required.

Each operations server hosts a component that interfaces with a controlled system and that processes data received from the system. This component is represented as system interface block 232 in operations server 206 and block 234 in operations server 208. Event reports are generated by the systems interface in response to the data received from the controlled system and are forwarded to an event server. Each operations server hosts an event server that is coupled to the system interface. For example, event server 236 is coupled to systems interface 232, and event server 238 is coupled to systems interface 234. The event server receives event reports from the system interface and transmits the event reports to clients ("event-server client") that have registered to receive such reports. The workstation applications 214 and 218 are example event-server clients. When an event-server client is started, it connects to the event server, for example, via a socket connection, and indicates to the event server the types of events for which event reports are to be forwarded to the client. The event server also receives event reports from the event-server clients.

Each event server can service multiple operations workstations, thereby providing multiple control points. Similarly, multiple workstation applications on a single operations workstation can be configured to control and monitor multiple systems via multiple event servers.

In support of sending operator-entered messages between operators at operations workstations, each of the operations servers 206 and 208 is configured with a messaging server. Operations server 206 hosts messaging server 242, and operations server 208 hosts messaging server 252. The messaging server facilitates communication between remote SPO servers.

When a message destined for remote operations server 208 is sent to messaging server 242 from workstation application 214, the messaging server forwards the message to remote messaging server 252 on operations server 208. Messaging server 252 then forwards the event report to its local event server 238, which in turn forwards the event report to the appropriate workstation application(s) 218. The operator may choose to send messages via attribute-change (AC) or alarm (AL) event reports, which causes messages to be shown as a component update in a status-type workstation classification or as an alarm in an alarm-type workstation application.

When a messaging server begins execution, it reads configuration information from configuration file 262 and begins listening for messages from remote messaging servers and one or more workstation applications adapted to obtain an operator message and provide the message to the messaging server. When the messaging server receives a message from a remote messaging server the message is forwarded in event report format to the local event server, which in turn forwards the event report to a workstation application that normally receives such event reports. When the messaging server receives a message from a workstation application, the message is forwarded to either a remote messaging server or to the local event server, depending on the specified destination.

The remote messaging server(s) to which a messaging server may connect is specified in the configuration data 262. For example, the configuration data 262 that are input to the messaging servers identify the operations servers that are present in the environment. In one embodiment, the configuration data indicate to the messaging server the port and the operations server to which to connect. The configuration data also specify the port on which to listen for incoming connections. It will be appreciated that the configuration data may be constituted as a single set of data, in multiple data sets, or configured within the hierarchy server and hierarchy client programs.

In the example embodiment, there are several types of event reports that are used by the workstation applications, event server, and system interface in controlling a system. A subset of all the types of event reports is used to support sending messages between operators. The types of event reports used in support of operator message passing include alarm-type event reports and attribute-change-type event reports. In the example implementation, an alarm-type event report is used by a workstation application to inform an operator of system condition that requires immediate attention. For example, an alarm-type event report is generated when a certain I/O throughput threshold is reached. An attribute-change-type event report is used to indicate a change in the value of a monitored attribute of the system, for example, the operational status of a storage device. By using multiple types of event reports, operators are able to communicate via multiple workstations applications. For example, an operator can send a message to a console workstation application using an alarm event report or send a message to a status workstation application via an attribute-change event report.

To send a message from an operator at operations workstation 202 (operator$_{202}$) to an operator at operations workstation 204 (operator$_{204}$), operator$_{202}$ initiates a workstation application, the messaging client, and enters the text to send. The messaging client also allows the operator to specify the destination operations server of the message and the type of event report in which the message is to be sent. The operator enters the message into the text box, selects the type of event report in which to send the message. In the SPO environment, the operator can select "SPO Console" for alarm-type event reports or "SPO Status" for attribute-change-type event reports. SPO Console refers to the workstation application in which alarm-type event reports are displayed, and SPO Status refers to the workstation application in which attribute-change type event reports are displayed. If the operator chose to send the message to the SPO Console, the message is incorporated into a an alarm-type report that is transmitted back to the sender and appears as an alarm in the sender's SPO Console workstation application.

Having received an operator message from a workstation application 214, messaging server 242 forwards it to the destination SPO server by connecting to the appropriate remote messaging server 252. Messaging server 252 then forwards the message to local event server 236, which in turn provides the event report to workstation application 218.

Figure 3:
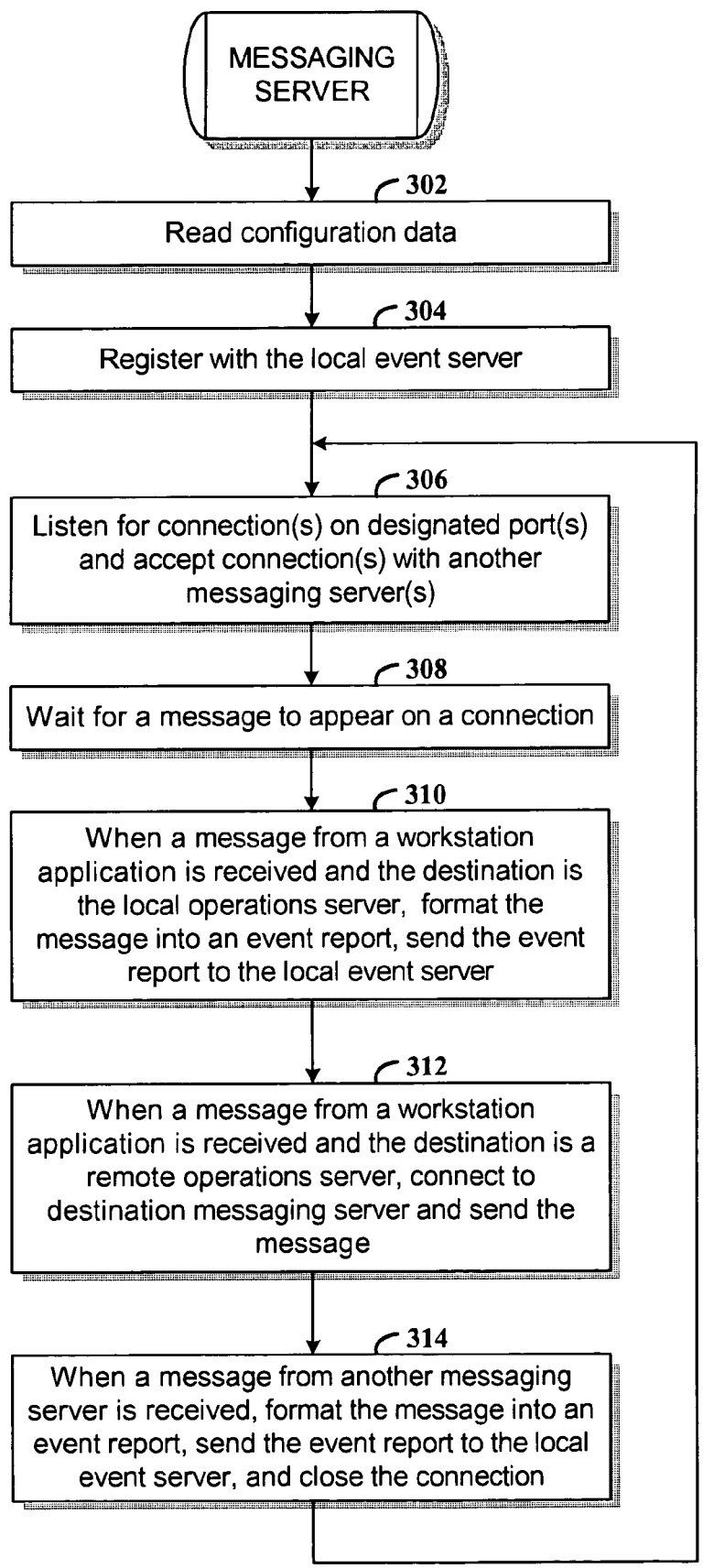
FIG. 3 is a flowchart of a process performed by a messaging server in accordance with one embodiment of the invention.

FIG. 3 is a flowchart of a process performed by a messaging server in accordance with one embodiment of the invention. The messaging server reads the configuration data (step 302), which indicates the operations server(s) to which the messaging server may send operator-entered messages. The messaging server registers with the local event server (step 304). The messaging server listens for connection requests from the other messaging servers in the environment (step 306), as specified by the configuration data. The messaging server then waits for an operator message to appear, either from another messaging server or from a workstation application (step 308).

When the messaging server receives an operator message, the message is transmitted to either a remote messaging server or to the local event server, depending on the specified destination of the message. For a message received from a workstation application where the destination is the local operations server, the messaging server formats the message into an event report (of the type specified by the operator and sends the event report to the local event server (step 310). For a message received from a workstation client where the operator-entered parameter indicates a remote operations server, the messaging server connects with the destination messaging server and sends the message (step 312). For a message received from a remote messaging server, the local messaging server formats the message into an event report and forwards the event report to the local event server (step 314), which in turn forwards the event report to the destination workstation application.

Figure 4A:
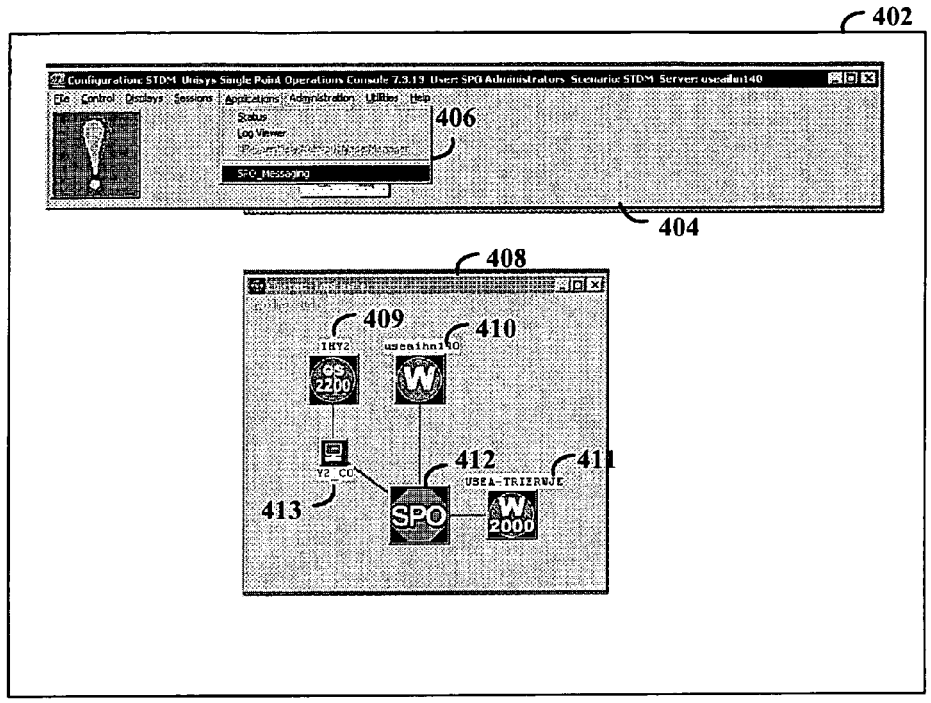
FIGS. 4A-4D illustrate a sequence of example screen dumps that illustrate composition and transmission of a message from an operations workstation.
Figure 4B:
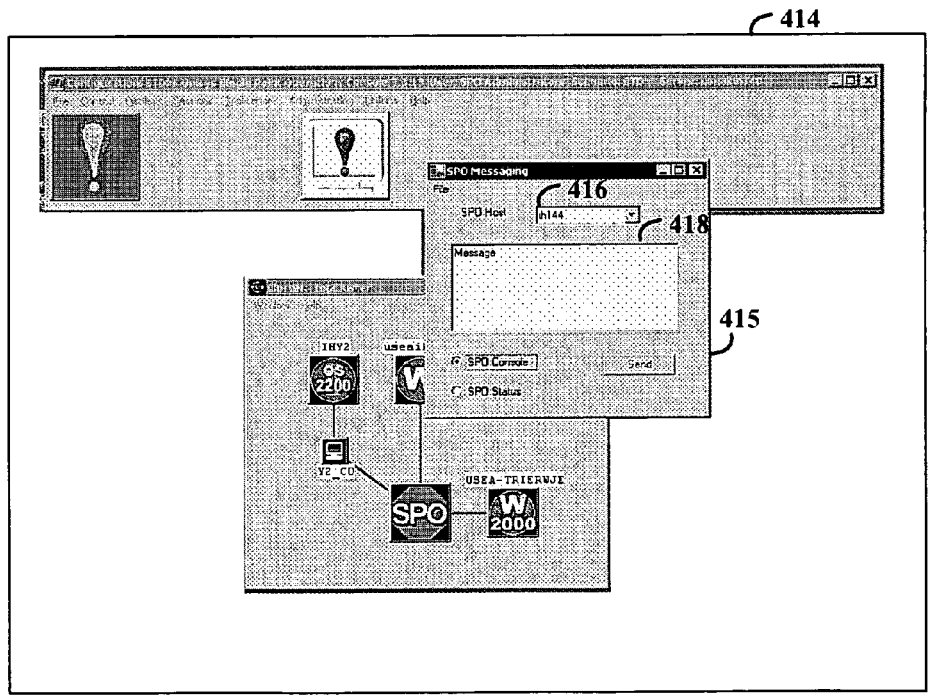
Figure 4C:
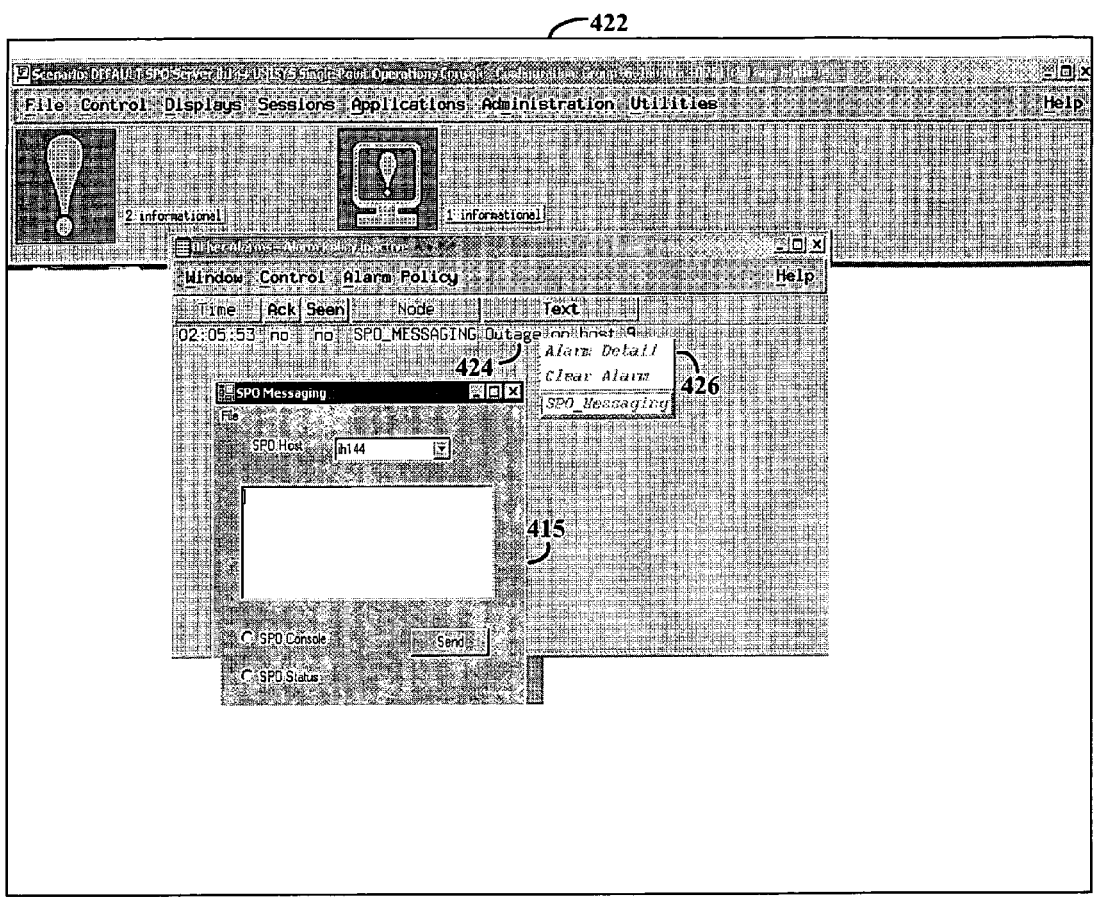

FIGS. 4A-4C illustrate a sequence of example screen dumps that illustrate composition and transmission of a message from an operations workstation. Each screen dump illustrates a collection of operator-interface windows specific to a SPO environment. It will be appreciated, however, that the invention is adaptable to other implementations. FIG. 4A illustrates a screen dump 402 in which an operator begins the process of composing a message to be sent to another operations server. Window 404 provides the operator interface for the console workstation application. The messaging service is initiated via pull-down menu 406. Window 408 illustrates the topology of the SPO environment, where icons 409, 410, and 411 represent the controlled computer systems, icon 412 represents an operations server, and icon 413 represents an operations console used to operate the computer system represented by icon 409.

FIG. 4B illustrates a screen dump 414 in which the messaging operator-interface window 415 appears in response to selection of the SPO Messaging menu choice in FIG. 4A. The messaging operator-interface window 415 allows the operator to specify by name the "SPO Host" (or operations server) to which the message is to be sent (text-entry box 416), the text of the message (text-entry box 418), and the workstation application ("SPO Console" or "SPO Status") to which the message is to be sent. Recall that in the SPO environment example, the alarm-type and attribute-change-type event reports are associated with the SPO Console and SPO Status application, respectively. If the operator selects SPO Console, the message will show up as an alarm. If the operator selects SPO Status, the message will be delivered to the SPO Status Class.

FIG. 4C illustrates a screen dump 422 in which an operator replies to a message, sent via an alarm-type event report, by selecting the text 424 of the message and selecting "SPO_Messaging" from the drop-down menu 426. The operator can then enter the desired response in the messaging operator-interface window 415.

Figure 4D:
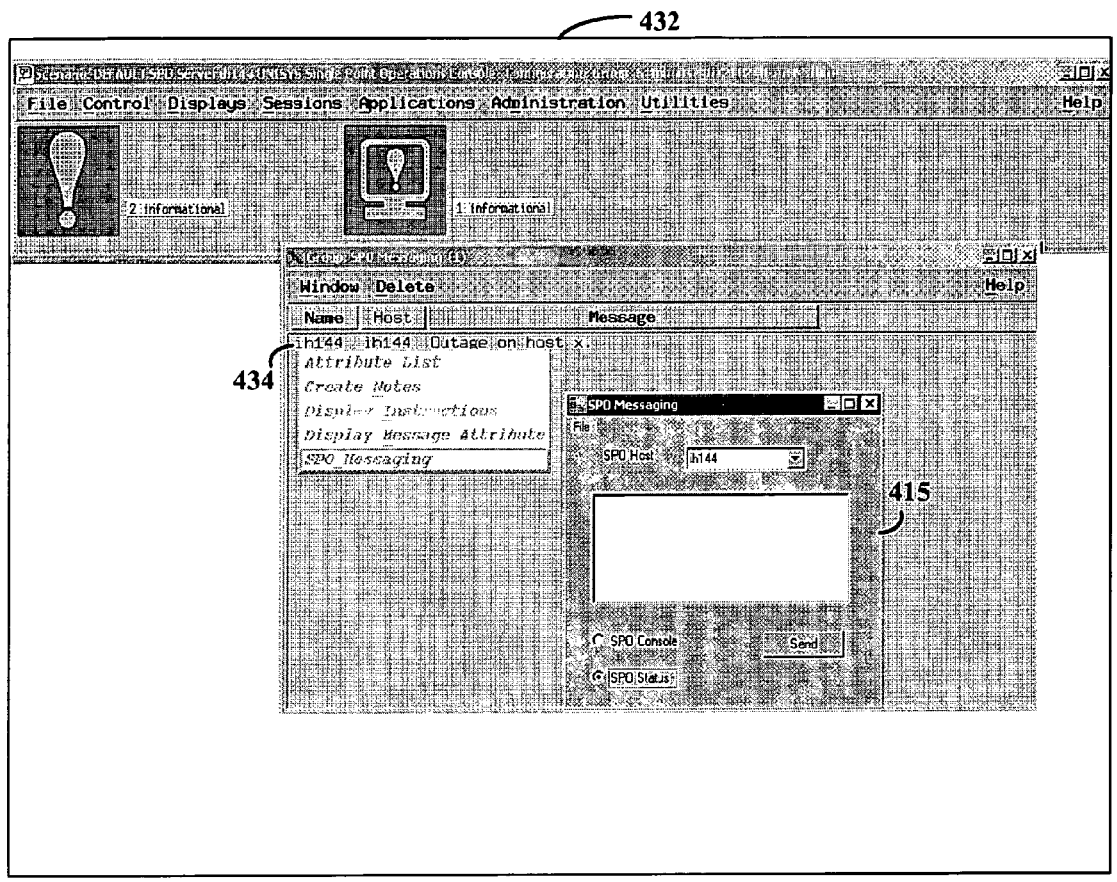

FIG. 4D illustrates a screen dump 432 in which an operator replies to a message, sent via an attribute-change-type event report to a status class, by selecting the name 434 of the operations server from which the message was sent.

In addition to the embodiments of the invention described above, other aspects and embodiments will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A method for sending a message from a first operator at a first of a plurality of workstations to a second operator at a second of the plurality of workstations in an operations-computing arrangement for operating one or more computer systems, the operations-computing arrangement including the first and second workstations coupled to respective operations servers and each of the plurality of workstations coupled to at least one of the operations servers, wherein each operations server is coupled to at least one computer system, each workstation executes software that provides an operator interface for operating a computer system and hosts a plurality of workstation applications, and each operations server provides an interface to a computer system, the method comprising:

generating system event reports in response to computer system events detected by an operations server;

transmitting the system event reports to one or more selected operations workstations;

displaying data associated with the system event reports at the one or more operations workstations;

providing an operator interface for entry of a text message at the first workstation;

providing a plurality of operator-selectable identifiers of workstation applications and a plurality of operator-selectable types of event-reports for use in association with the text message;

transmitting the text message from the first workstation to an operations server;

generating at the operations server system a system event report that is of the type specified by the operator and that contains the text message and an associated identifier of a workstation application specified by the operator for the text message;

transmitting the system event report that contains the text message from the operations server to the second workstation;

wherein the generating and transmitting of the system event report that contains the text message are performed without waiting for a computer system event;

transmitting the event report to the workstation application identified by the associated identifier;

displaying the system event report that contains the text message at the second workstation in a window in which a format of displayed data depends on the type of event report;

providing a plurality of operator-selectable names of operations servers for use in association with the text message;

wherein transmitting a message from a workstation to a messaging server includes transmitting to the messaging server in association with the message a name of an operator-selected destination operations server; and connecting to a messaging server on the destination operations server, and transmitting the message to the messaging server on the destination operations server.

2. The method of claim 1, wherein each operations server hosts an event server and a messaging server coupled to the event server, the method further comprising:
- establishing connections between the messaging servers;
- establishing a connection between each pair of event server and messaging server hosted by the same operations server;
- wherein transmitting the text message from the first workstation to an operations server includes transmitting the message to a messaging server on the operations server;
- transmitting a message received from a workstation at a first messaging server to a second messaging server;
- formatting the message received from the first messaging server by the second messaging server into a system event report, and forwarding the system event report to a connected event server; and
- transmitting the system event report received from the second messaging server at the connected event server to the second workstation.

3. The method of claim 1, wherein the operations-computing arrangement further includes a plurality of workstations coupled to at least one of the operations servers, the method further comprising:
- transmitting the system event report that contains the text message from the operations server to each workstation connected to the operations server; and
- displaying the system event report that contains the text message at each workstation connected to the operations server.

4. The method of claim 1, further comprising:
- providing a plurality of operator-selectable names of operations servers for use in association with the text message;
- transmitting the message to the operations server identified by the name of an operator-selected destination operations server.

5. An apparatus for sending a message from a first operator at a first of a plurality of workstations to a second operator at a second of the plurality of workstations in an operations-computing arrangement for operating one or more computer systems, the operations-computing arrangement including the first and second workstations coupled to respective operations servers and each of the plurality of workstations coupled to at least one of the operations servers, wherein each operations server is coupled to at least one computer system, each workstation executes software that provides an operator interface for operating a computer system and hosts a plurality of workstation applications, and each operations server provides an interface to a computer system, the method comprising:
- means for generating system event reports in response to computer system events detected by an operations server;
- means for transmitting the system event reports to one or more selected operations workstations;
- means for displaying data associated with the system event reports at the one or more operations workstations;
- means for providing an operator interface for entry of a text message at the first workstation;
- means for providing a plurality of operator-selectable identifiers of workstation applications and a plurality of operator-selectable types of event-reports for use in association with the text message;
- means for transmitting the text message from the first workstation to an operations server;
- means for generating at the operations server system a system event report that is of the type specified by the operator and that contains the text message and an associated identifier of a workstation application specified by the operator for the text message;
- means for transmitting the system event report that contains the text message from the operations server to the second workstation;
- wherein the means for generating and means for transmitting the system event report that contains the text message do not wait for a computer system event;
- means for transmitting the event report to the workstation application identified by the associated identifier;
- means for displaying the system event report that contains the text message at the second workstation in a window in which a format of displayed data depends on the type of event report;
- means for providing a plurality of operator-selectable names of operations servers for use in association with the text message;
- wherein the means for transmitting a message from a workstation to a messaging server includes means for transmitting to the messaging server in association with the message a name of an operator-selected destination operations server; and
- means for connecting to a messaging server on the destination operations server, and transmitting the message to the messaging server on the destination operations server.

6. A system for sending messages between operators at operations workstations in an operations-computing arrangement for operating a plurality of computer systems, comprising:
- a plurality of operations workstations, wherein each operations workstation hosts a plurality of operations applications, each application providing an operator interface for operating a computer system;
- a plurality of operations servers coupled to the operations workstations and coupled to the computer systems, each operations server providing an interface to a computer system and configured to generate system event reports in response to computer system events and to transmit the system event reports to one or more selected operations applications;
- wherein each operations application is configured to display data associated with the system event reports;
- wherein at least one of the operations applications is configured to provide an operator interface for entry of a text message, provide a plurality of operator-selectable types of event-reports and operator-selectable identifiers of the operations applications for use in association with the text message, and transmit the text message to an operations server, and each operations server is configured to transmit a text message to a selected operations server, selectively generate a system event report from a text message, and transmit the event report to an operations application identified by the associated identifier of a workstation application specified by the operator for the text message, wherein the operations server generates and transmits the system event report that contains the text message without waiting for a computer system event;
- wherein each operations server is further configured to generate an event report of a type specified by an operator for a text message;
- at least one of the workstation applications is configured to display a system event report that contains a text message in a window in which a format of displayed data depends on an operator-selected type of event report;

wherein the operations application that is configured to provide an operator interface for entry of a text message is further configured to provide a plurality of operator-selectable names of destination operations servers for use in association with a text message; and wherein each messaging server is further configured to connect to a messaging server on the destination operations server and transmit an operator-entered text message to the messaging server on the destination operations server.

7. The system of claim 6, further comprising:

a plurality of event servers and a plurality of messaging servers hosted by the operations servers, wherein each operations server hosts an event server and a messaging server;

wherein each messaging server is configured to connect to the other messaging servers and connect to an event server hosted on the operations server hosting the messaging server;

wherein each operations application is configured to connect to a messaging server and transmit an operator-entered text message to the messaging server, and each messaging server is configured to transmit an operator-entered text message to another messaging server, format an operator-entered text message into a system event report, and forward the system event report to an event server hosted on the operations server hosting the messaging server; and wherein each event server is configured to transmit a system event report to one or more operations applications on one or more operations workstations.

8. The system of claim 7, wherein each messaging server is further configured to generate an event report having an associated identifier of a workstation application specified by an operator for a text message.

9. The system of claim 6, further comprising:

wherein the operations application that is configured to provide an operator interface for entry of a text message, is further configured to provide a plurality of operator-selectable names of operations servers for use in association with a text message; and wherein each messaging server is further configured to transmit a text message to the operations server identified by the name of an operator-selected destination operations server.

\* \* \* \* \*